(12) United States Patent
Huang et al.

(10) Patent No.: US 7,184,804 B2
(45) Date of Patent: Feb. 27, 2007

(54) FOLDABLE BASE

(75) Inventors: Hsu-Shih Huang, Hsinchu (TW); Ming-Tsai Chung, Hsinchu (TW)

(73) Assignee: D-Link Corporation (TW)

( * ) Notice: Subject to any disclaimer, the term of this patent is extended or adjusted under 35 U.S.C. 154(b) by 203 days.

(21) Appl. No.: 10/900,115

(22) Filed: Jul. 28, 2004

(65) Prior Publication Data

US 2006/0025183 A1 Feb. 2, 2006

(51) Int. Cl.
*H04M 1/00* (2006.01)

(52) U.S. Cl. ............... 455/575.3; 455/575.1; 455/569.1; 379/449; 379/455

(58) Field of Classification Search ............ 455/575.3, 455/575.1, 569.1; 379/449, 455
See application file for complete search history.

(56) References Cited

U.S. PATENT DOCUMENTS

| 5,943,627 | A  | * | 8/1999 | Kim et al. ............... 455/569.1 |
| 6,568,576 | B1 | * | 5/2003 | Godshaw et al. .......... 224/647 |
| 2005/0157869 | A1 | * | 7/2005 | Wang ...................... 379/455 |

* cited by examiner

*Primary Examiner*—Lester G. Kincaid
*Assistant Examiner*—Shantell Portis
(74) *Attorney, Agent, or Firm*—Bacon & Thomas PLLC (57) ABSTRACT

The present invention discloses a foldable base with a main body comprising a long groove, a latching section, a latched section and an insert slot; wherein the main body can be folded along the long groove to connect the latching section with the latched section to define a three-dimensional shape or unfolded to separate the latching section and the latched section and then spread the main body open along the long groove to define a sheet. The insert slot is coupled to a fixed base being coupled to a main system such as a personal computer (PC) or a personal digital assistant (PDA) by a transmission line, enabling a user to insert an electronic device such as a flash drive or a MP3 player through the insert slot into the fixed base.

8 Claims, 8 Drawing Sheets

FOLDABLE BASE

FIELD OF THE INVENTION

The present invention relates to a foldable base, more particularly to a base that can be folded into a three-dimensional object or unfolded into a sheet.

BACKGROUND OF THE INVENTION

Unlike the past, the present world has entered into a new era with blooming technologies, and various electronic products are introduced into the markets constantly, and such technologies bring us tremendous convenience and enhance the quality of our life. It is obvious that electronic products have become an integral part of our daily life, and thus enterprises and manufacturers put up lots of efforts on research and development to provide us more convenient and efficient applications of the electronic products.

Figure 1:
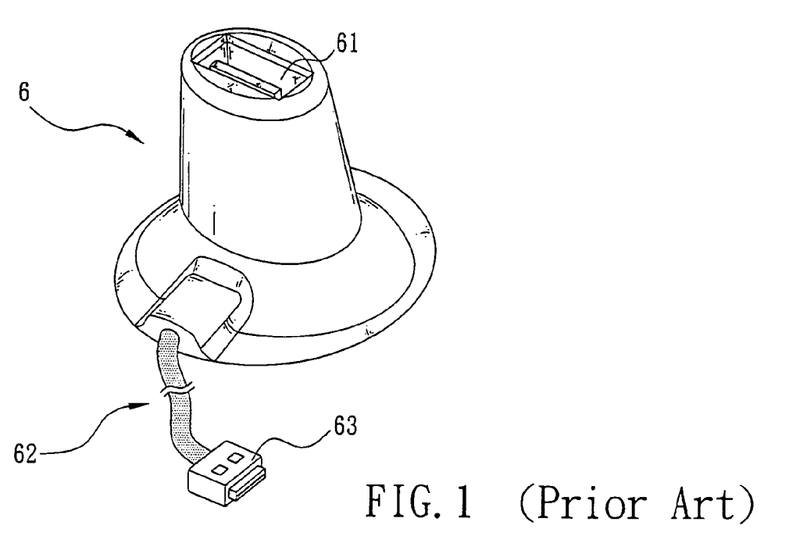
FIG. 1 is a perspective view of the USB extension base according to a prior art.

Please refer to FIG. 1 for the R.O.C. Patent Publication No. 527,027, which disclosed a USB extension base. The USB extension base according to such patent is a base 6 comprising a connecting socket 61 therein, an extension cord 62 with one end connected to the connecting socket 61 in the base 6 and the other end of the extension cord 62 connected to a connector 63, so that when a user inserts an electronic device such as a flash drive or a MP3 player, etc into the connecting socket 61, the electronic device will be installed (or erected) on the base 6 to electrically connect the electronic device to another electronic product such as a personal computer (PC) or a personal digital assistant (PDA) by the extension cord 62 for transmitting data.

Figure 2:
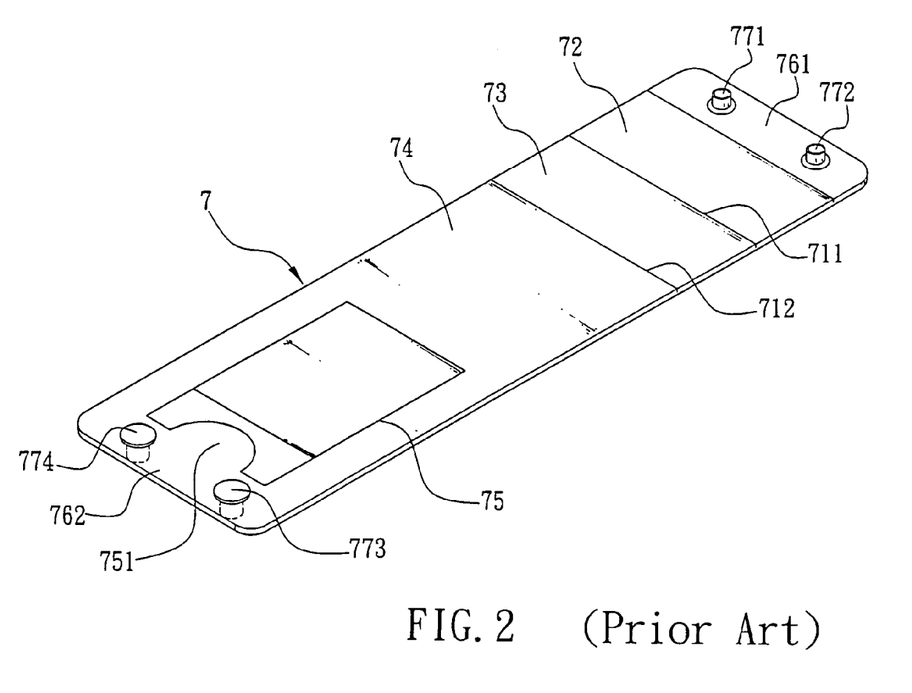
FIG. 2 is a perspective view of the unfolded mobile phone seat assembly according to a prior art.

Please refer to FIG. 2 for another prior art as disclosed in the R.O.C. Patent Publication No. 536,075, which relates to a mobile phone seat assembly. Such assembly has a sheet member 7, and the sheet member 7 is comprised of a bottom sheet 72, a back sheet 73 and a front sheet 74 and the sheet member 7 is folded along a plurality of folding lines 71, 72 thereon. The front sheet 74 can be folded downward to define a retaining bottom 75 for placing a mobile phone, and the bottom side of the retaining bottom has a stop plate 751 for pressing on the mobile phone. Both ends 761, 762 of the sheet member 7 have two protruded buttons 771, 772 and two corresponding recessed buttons 773, 774. Thus, when a user folds the sheet member 7 along the folding lines 711, 712 to press one end 761 of the sheet member 7 to the other end 762 of the sheet member 7, the two protruded buttons 771, 772 and the two recessed buttons 773, 774 are connected respectively to each other, and the sheet member 7 forms a seat for retaining the mobile phone. If the user inserts the mobile phone into the seat, the mobile phone will be embedded into the retaining bottom 75 and set into a fixed position by the stop plate 751.

Figure 3:
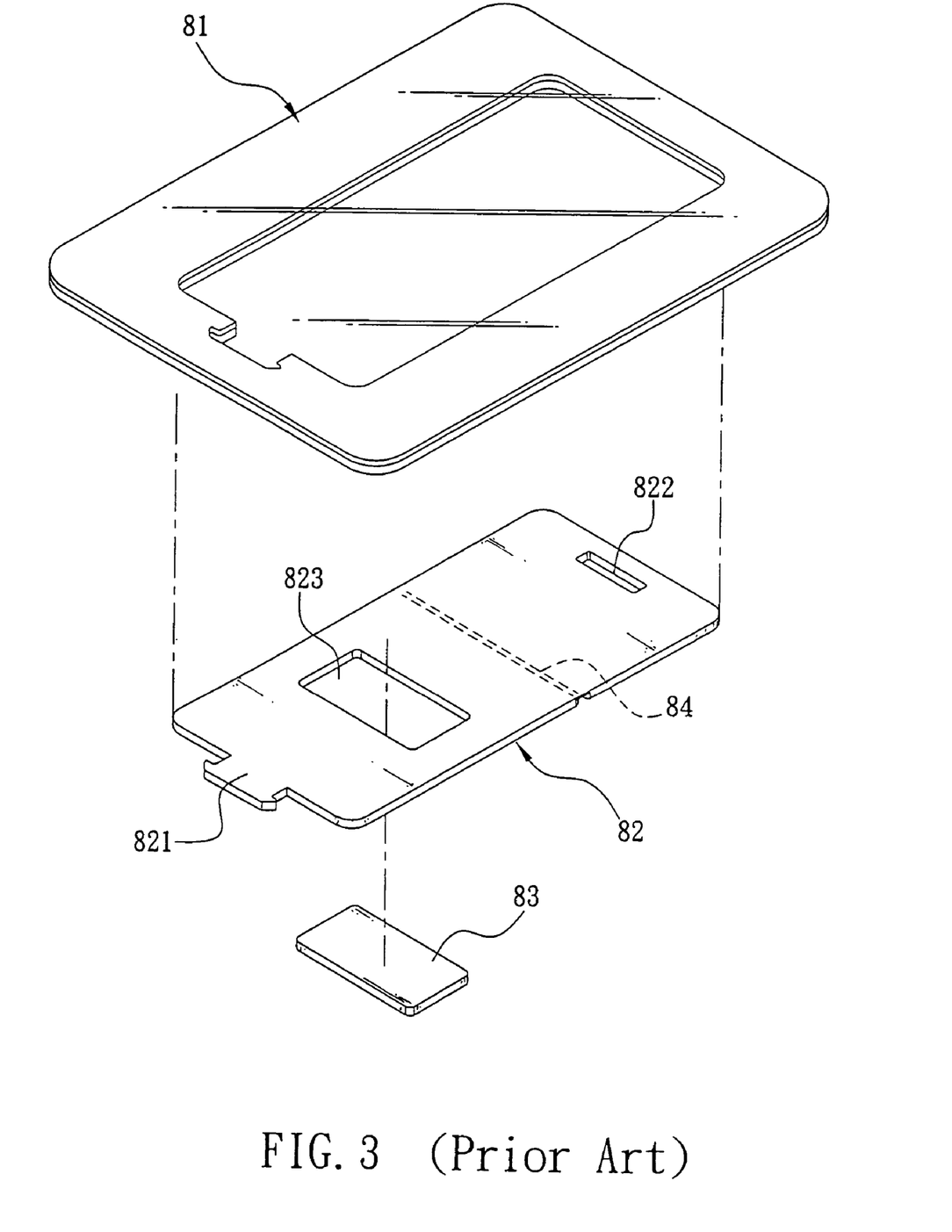
FIG. 3 is a perspective view of the mouse pad with a mobile phone seat according to a prior art.
Figure 6:
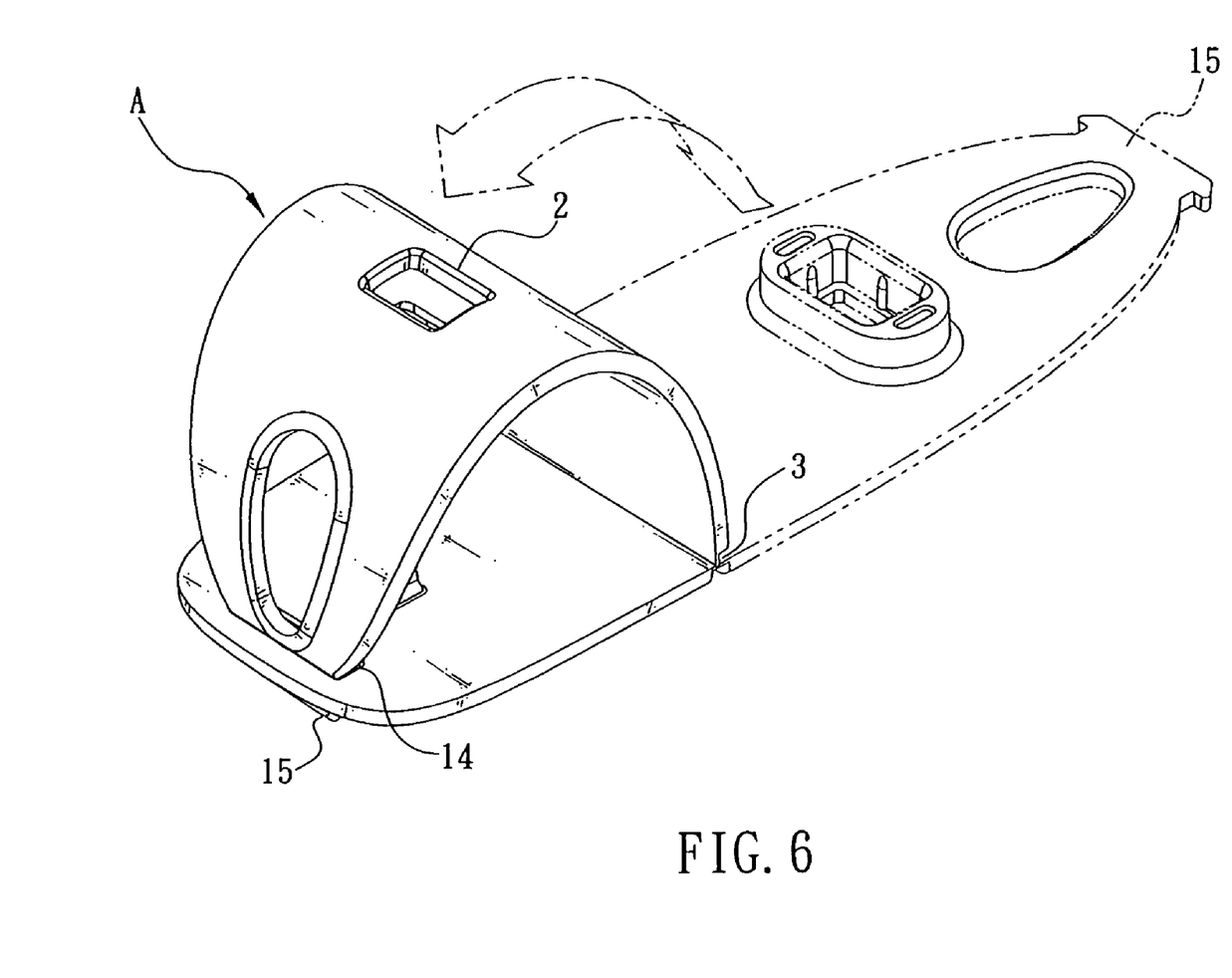
FIG. 6 is an illustrative view of the step taken for assembling the foldable base according to the present invention.

Please refer to FIG. 3 for another prior art as disclosed in the R.O.C. patent Publication No. 512,950, which relates to a mouse pad with a mobile phone seat function. Such mouse pad comprises a detachable mobile phone seat 82 at the bottom of the mouse pad 81, a hook 821 at one end of the mobile phone seat 82 and a groove 822 at the other end of the mobile phone seat 82. The main body 82 of the mobile phone has a groove 84 disposed at a position adjacent to the groove 822. The main body 82 of the mobile phone further comprises a hollow section 823 disposed between the hook 821 and the groove 84, and a detachable plate 83 disposed inside the hollow section 823, so that the main body 82 of the mobile phone can be folded along the grooves 84 to connect the hook 821 with the groove 822, and the main body 82 of the mobile phone forms a tapered cone (viewing from the side as shown in FIG. 6), and the hollow section 823 will be disposed precisely on the top of the cone. Therefore, when a user inserts a mobile phone into the hollow section 823, the mobile phone will erect securely on the cone.

The aforementioned USB extension base is a base with a fixed shape, and the socket 61 is designated the universal serial bus (USB) connection. In addition, the other two prior arts (the mobile phone seat assembly and the mouse pad having a mobile phone seat have the function for placing a mobile phone only. Therefore, each of the foregoing designs does not meet the requirements of the present information product and the design concept of pursuing convenient portability, diversified functions and special stylish design. Therefore, the way of designing a base for conveniently storing an electronic product and a product having diversified functions is an important topic that demands immediate attention.

SUMMARY OF THE INVENTION

The primary objective of the present invention is to provide a foldable base with a main body comprising a long groove, a latching section and a latched section; wherein the main body can be folded along the long groove to connect the latching section with the latched section to define a three-dimensional shape or unfolded to separate the latching section and the latched section and spread the main body open along the long groove to define a sheet. The main body further comprises an insert slot and the insert slot is coupled to a fixed base, and the fixed base is coupled to a main system such as a personal computer (PC) or a personal digital assistant (PDA) by a transmission line, so that when a user inserts an electronic device such as a flash drive or a MP3 player through the insert slot into the fixed base, the electronic device will be electrically connected to the main system for transmitting data by a data transmission protocol such as a universal serial bus (USB) and a recommended Standard-232 (RS-232).

The above and other objects, features and advantages of the present invention will become apparent from the following detailed description taken with the accompanying drawing.

DETAILED DESCRIPTION OF THE PREFERRED EMBODIMENTS

Figure 4:
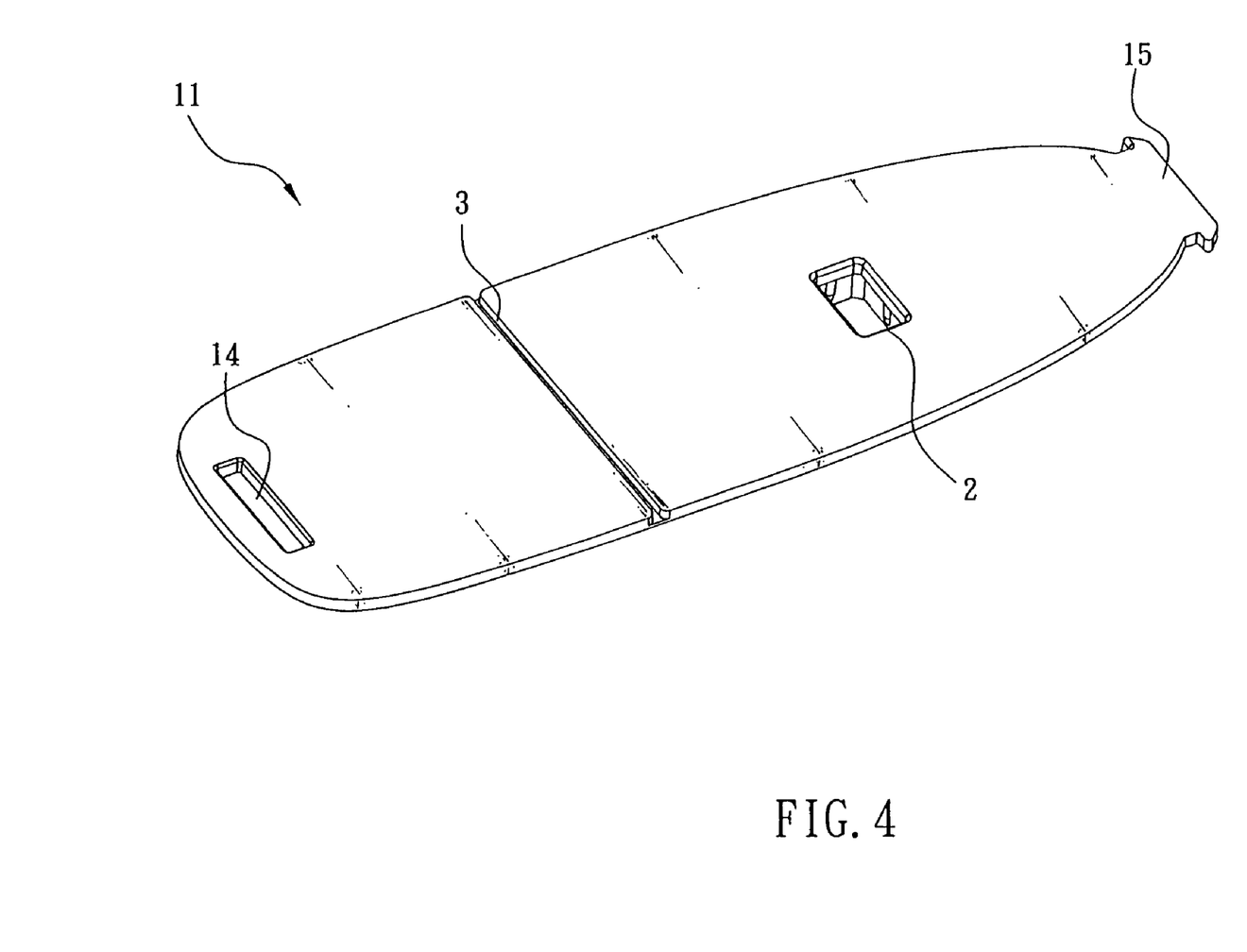
FIG. 4 is a front view of the foldable base of the present invention.
Figure 5:
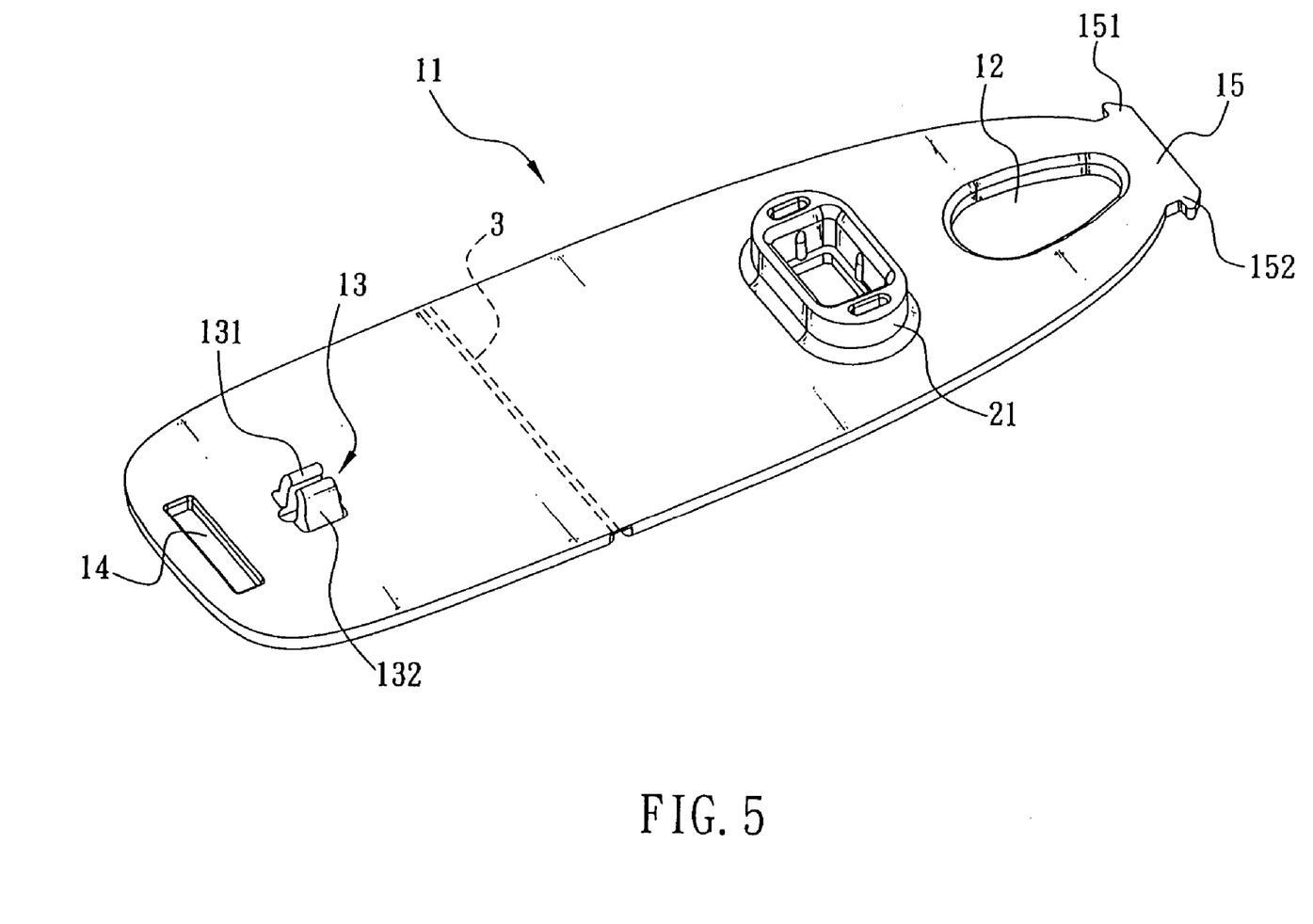
FIG. 5 is a back view of the foldable base of the present invention.
Figure 7:
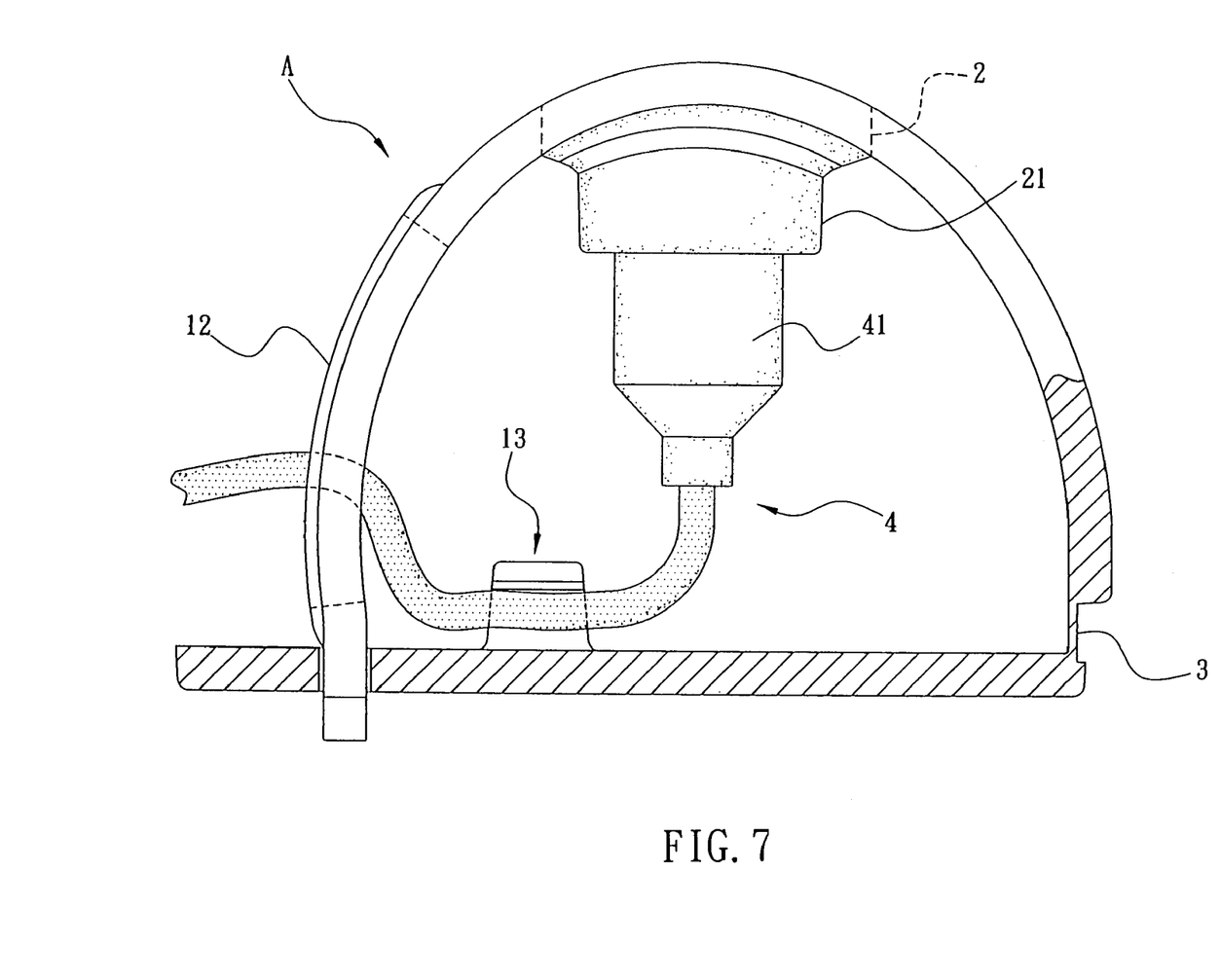
FIG. 7 is a side view of the foldable base of the present invention.

Please refer to FIG. 4 for a foldable base of the present invention. In the figure, a main body 11 comprises a latching section 15 at one end, a latched section at the other end, and a long groove disposed between the latching section 15 and the latched section 14 and extending to both sides of the main body 11, and after the main body 11 is bent to the long groove 3 to connect the latching section 15 to the latched section 14, a three-dimensional shape is defined. Further, an insert slot 2 passes through the main body 11 and is disposed between the latching section 15 and the long groove 3, and a fixed base 21 as shown in FIG. 5 is disposed at the insert slot 2 on the main body 11 with its back facing one side of the long groove 3. The present invention also comprises a transmission line 4 as shown in FIG. 7, and the transmission line 4 has a connecting section 41 at one end for connecting the fixed base 21 and the other end of the transmission line 4 is connected to a main system such as a personal computer (PC) or a personal digital assistant (PDA).

Please refer to FIG. 6. With the assembly of the foregoing components, if a user wants to use an electronic device such as a flash drive, a MP3 player, or a mobile phone (not shown in the figure), then the main body 11 as shown in FIG. 5 can be folded along the long groove 3 to connect the latching section 15 with the latched section 14 to define a three-dimensional base A. Please refer to FIG. 7. If the user places the connecting section 41 into the fixed base 21, the other end of the transmission line 4 will connect with the main system (not shown in the figure. Therefore, if the user passes the electronic device through the insert slot 2 into the fixed base 21, the electronic device will be engaged (or erected) on the base A and the electronic device connects to the main system through the transmission line 4 by a data transmission protocol such as the universal serial bus (USB) and the recommended standard-232 (RS-232) to transmit data. Further, when the user is not using the base A, the connecting section 41 can be taken out from the fixed base 21 to separate the latching section 15 from the latched section 14, and then the base A can be spread open along the long groove 3 to form a sheet and let the user store and carry the folded base A conveniently and easily.

Figure 9:
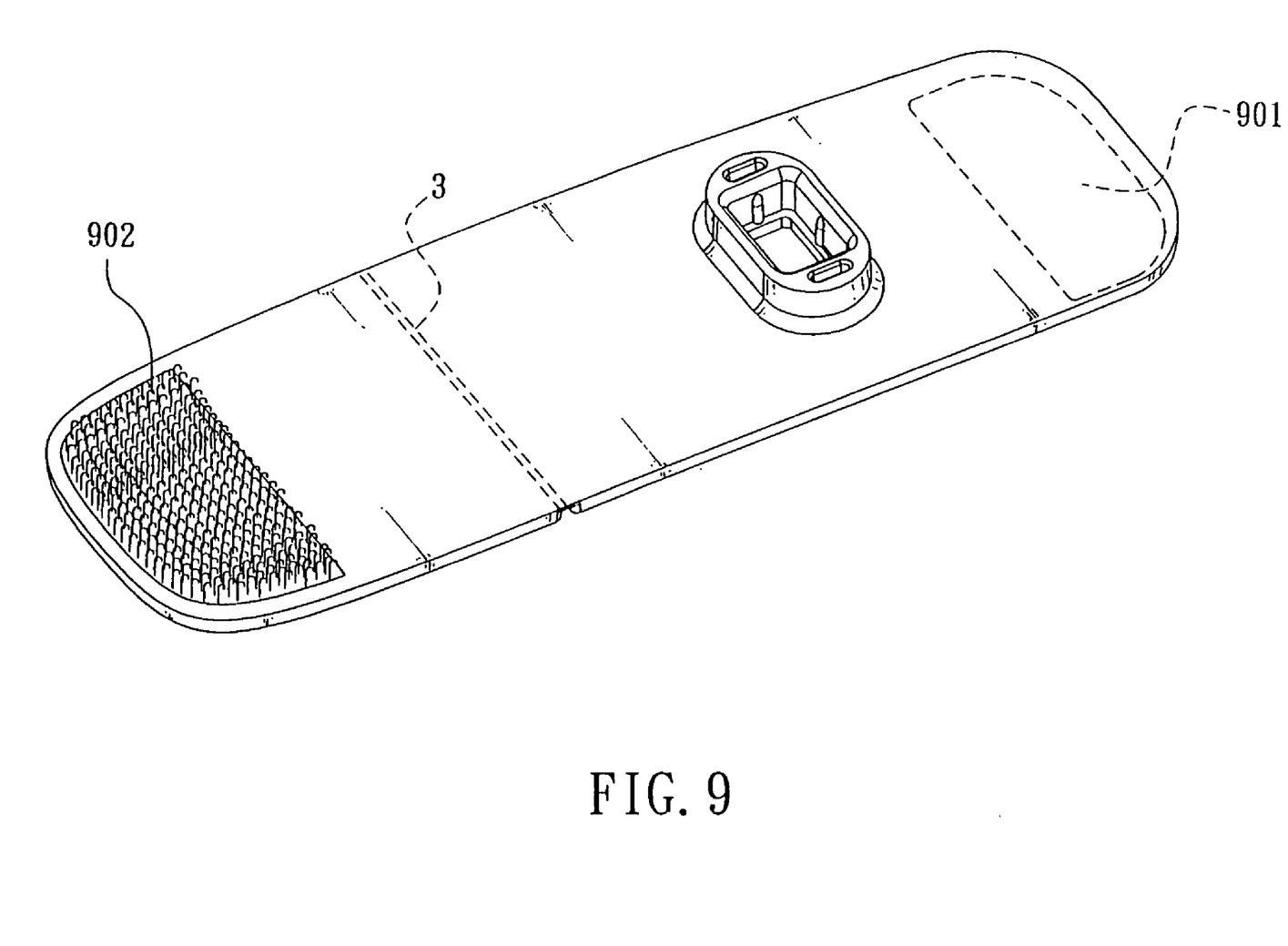
FIG. 9 is a perspective view of the foldable base adopting an adhesive tape according to the present invention.

Please refer to FIG. 5 for a preferred embodiment of the present invention, which comprises a protruded member 151 on the latching section 15 at a position adjacent to one side of the main body 11 and anther protruded member 152 at the other side. The latched section 14 is a hollow with an opening, and the length of the latched section 14 is slightly smaller than the total length of the protruded members 151, 152. Therefore, when the user passes the protruded members 151, 152 through the latched section 14 to press against the main body 11 at the positions adjacent to both ends of the latched section 14, the latching section 15 is limited inside the latched section 14. The latching section 15 according to another embodiment comprises a plurality of protruded buttons 771, 772 and the latched section 14 comprises a plurality of corresponding recessed buttons 773, 774 as shown in FIG. 2, such that the protruded buttons 771, 772 and the recessed buttons 773, 774 can be connected with each other respectively. Further, the latching section 15 and the latched section 14 according to another embodiment individually comprise corresponding adhesive tapes 901, 902 (as shown in FIG. 9), and the two adhesive tapes 901, 902 are adhered with each other. Therefore, the foregoing three embodiments can achieve the objectives of forming the base A in a fixed shape from the main body 11.

Please refer to FIG. 5 for a further embodiment of the present invention. The main body 11 comprises a hollow groove 12 disposed between the latching section 15 and the fixed base, so that when a user puts the connecting section 41 into the fixed base 12 as shown in FIG. 7, the other end of the transmission line 4 passes through the hollow groove 12 such that the base A is exposed. Further, a wire clipping section 13 disposed on the main body 11 with its back facing one side of the long groove 3 and between the fixed base 21 and the latched section 14. A wire clipping member 131 is disposed on one side of the wire clipping section 13 and another wire clipping member 132 is disposed on the other side, and an end of both wire clipping members 131, 132 away from the main body 11 is bending towards the center of the wire clipping section 13, so that the total distance between both ends is smaller than the width of the transmission line 4. Please refer to FIG. 7. If the user puts the connecting section 41 into the fixed base 21, the transmission line 4 passes through the wire clipping section 13 and is clipped by the wire clipping members 131, 132, so that the transmission line 4 is fixed by the wire clipping section 13 and exposed from the base A.

Figure 8:
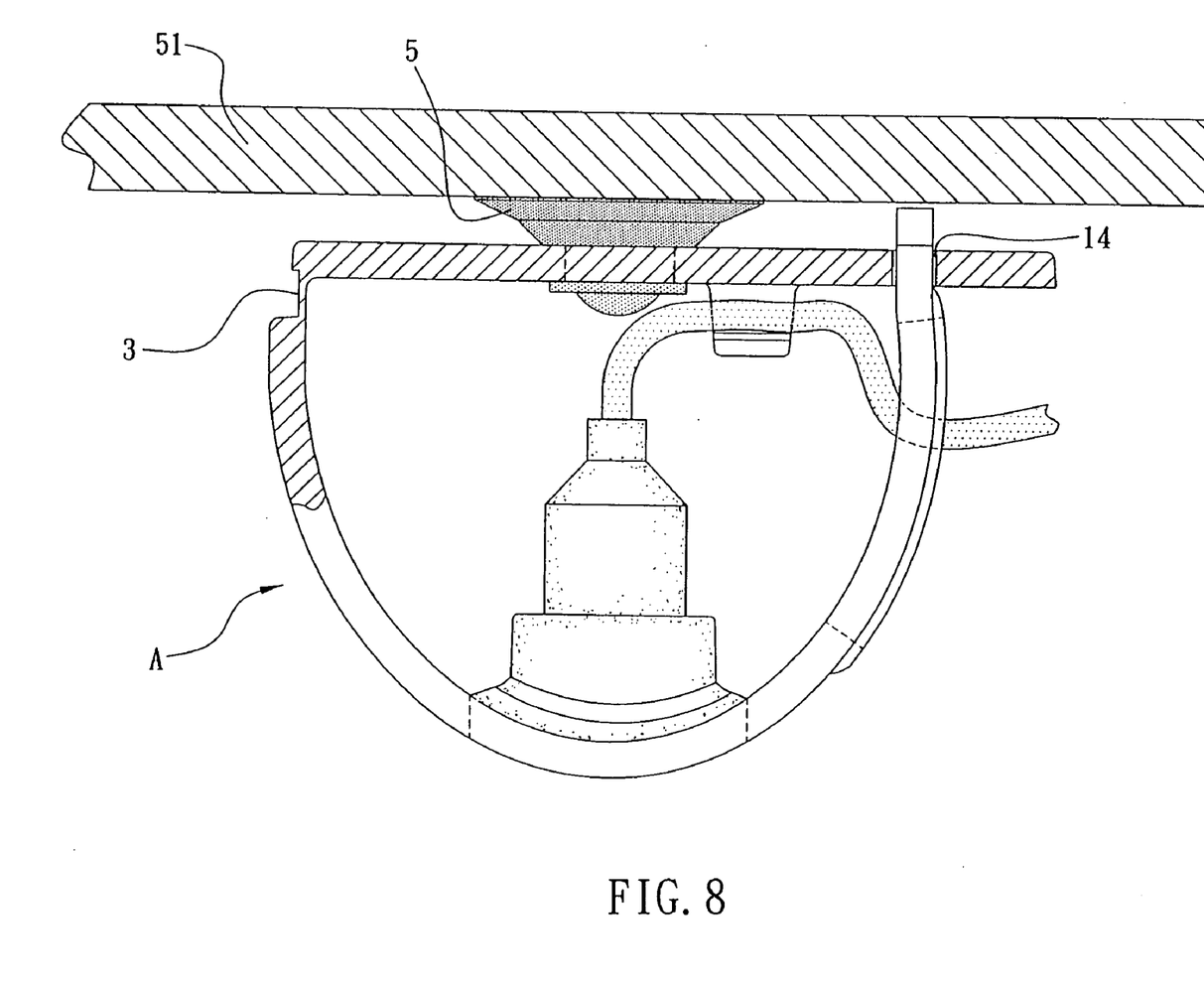
FIG. 8 is a side view of the foldable base according to another preferred embodiment of the present invention.

The main body 11 according of another embodiment of the present invention as shown in FIG. 5 comprises a sucking disk 5 disposed on one side of the long groove 3 and between the long groove 3 and the latched section 14. Please refer to FIG. 8. The base A is attached onto a plane 51 (such as a computer chassis or a tabletop) by the sucking disk 5, so that the base A can be fixed onto an appropriate plane according to the user's preference.

While the invention has been described by means of specific embodiments, numerous modifications and variations could be made thereto by those skilled in the art without departing from the scope and spirit of the invention set forth in the claims.

What is claimed is:

1. A foldable base, comprising:
   a main body, being in the shape of a sheet;
   a latching section, being disposed at an end of said main body;
   a latched section, being disposed on another end of said main body;
   a long groove, being disposed between said latching section and latched section and extended to both sides of said main body to bend said main body along said long groove and couple said latching section with said latched section to define a three-dimensional shape;
   an insert slot, being disposed between said latching section and said long groove and passing through said main body;
   a fixed base, being disposed on said main body at said insert slot;
   a transmission line having a connecting section on one end for coupling to said fixed base, another end of said transmission line being configured to be removably coupled to a main system; and
   a wire clipping section disposed on said main body between said fixed base and said latched section, the wire clipping section having a back facing said long groove.

2. The foldable base of claim 1, wherein said latching section comprises:

a first protruded member, being protruded from said latching section at a position adjacent to one side of said main body;

a second protruded member, being protruded from said latching section at a position adjacent to another side of said main body;

thereby said latched section is a hollow with an opening, and said first and second protruded members pass through said latched section and press against said main body at the positions adjacent to both ends of said latched section to limit said latching section in said latched section.

3. The foldable base of claim 1, wherein said latching section comprises at lease one protruded button, and said latched section comprises a recessed button corresponding to said each protruded button, and said each protruded button is coupled to said each recessed button.

4. The foldable base of claim 1, wherein said latching section comprises an adhesive tape for adhering another corresponding adhesive tape disposed on said latched section.

5. The foldable base of claim 1, wherein said main body comprises a hollow open groove dispose between said fixed base and said latching section.

6. The foldable base of claim 1, wherein said wire clipping section comprises a wire clipping member on one side of said wire clipping section and another wire clipping member on the other side of said wire clipping section, and said wire clipping member and said other wire clipping member with their backs facing one end of said main body and bending towards the center of said wire clipping section.

7. The foldable base of claim 1, wherein said main body comprises a sucking disk disposed on one side of said long groove and between said long groove and said latching section.

8. The foldable base of claim 1, wherein said connecting section of said transmission line is configured to be removably coupled to said fixed base.

* * * * *